United States Patent

[11] 3,622,941

| [72] | Inventor | Judson Douglas Wetmore<br>San Mateo, Calif. |
|---|---|---|
| [21] | Appl. No. | 771,810 |
| [22] | Filed | Oct. 30, 1968 |
| [45] | Patented | Nov. 23, 1971 |
| [73] | Assignee | Raychem Corporation<br>Menlo Park, Calif. |
| [32] | Priority | Oct. 30, 1967 |
| [33] | | Australia |
| [31] | | 29135/67 |
| | | Continuation-in-part of application Ser. No. 591,914, Nov. 3, 1966, now abandoned. This application Oct. 30, 1968, Ser. No. 771,810 |

[54] HEAT RECOVERABLE ARTICLE WITH MECHANICAL INSERT
33 Claims, 15 Drawing Figs.

[52] U.S. Cl. .................................................. 339/98, 339/274 R
[51] Int. Cl. .................................................. H01r 11/20

[50] Field of Search ................................... 339/97–99, 201, 213, 274

[56] References Cited
UNITED STATES PATENTS

| 1,515,860 | 11/1924 | Howard .................. | 339/201 |
| 2,534,881 | 12/1950 | Schroeder ................ | 174/84 |
| 2,715,714 | 8/1955 | Pavlinetz .................. | 339/213 |
| 3,012,882 | 12/1961 | Muldawer et al. ........ | 75/134 |

FOREIGN PATENTS

| 469,448 | 7/1937 | Great Britain ............. | 339/201 |

Primary Examiner—Joseph H. McGlynn
Attorney—Lyon & Lyon

ABSTRACT: A heat recoverable article for making mechanical or electrical connections or the like having a mechanical insert positioned within a heat recoverable sleeve. The mechanical insert is constructed so that it has a mechanical advantage, that is, it in some fashion multiplies or converts the force exerted upon it by heat recovery of the sleeve, and applies the force to the object or objects to be connected.

PATENTED NOV 23 1971 3,622,941
SHEET 1 OF 2
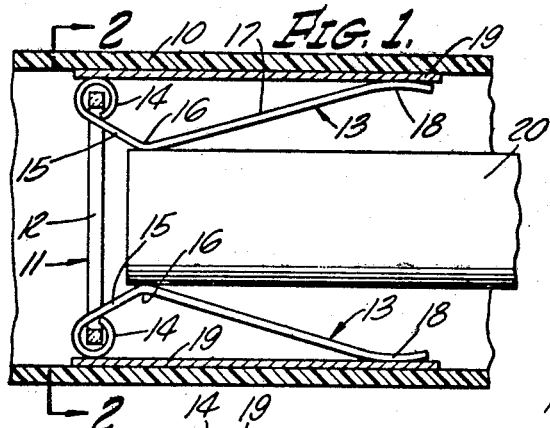
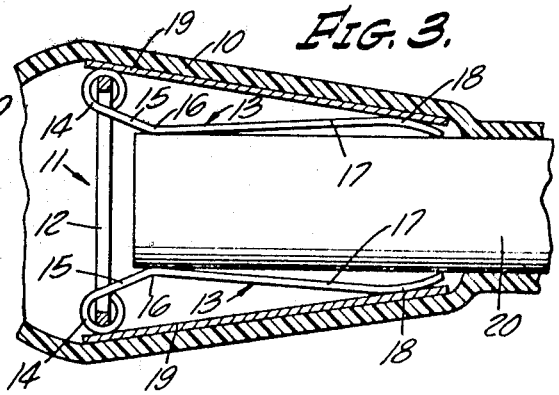
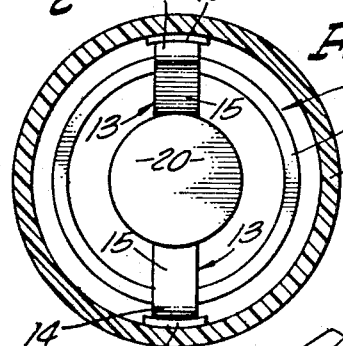
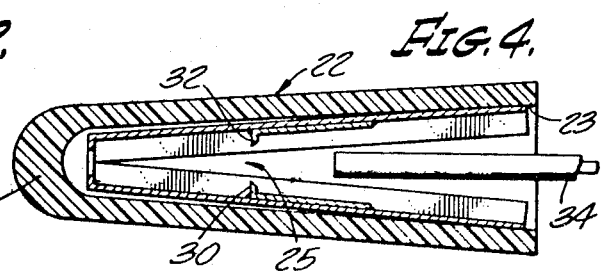
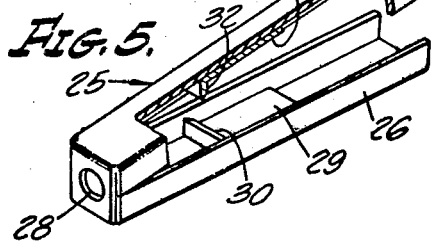
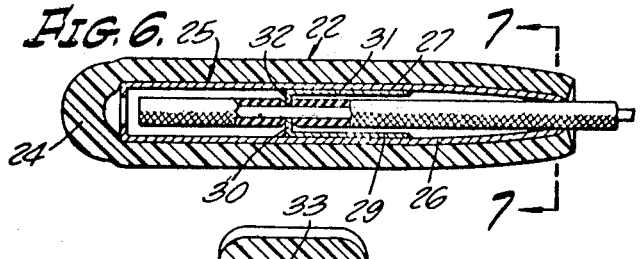
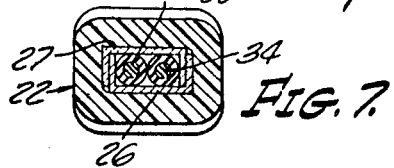
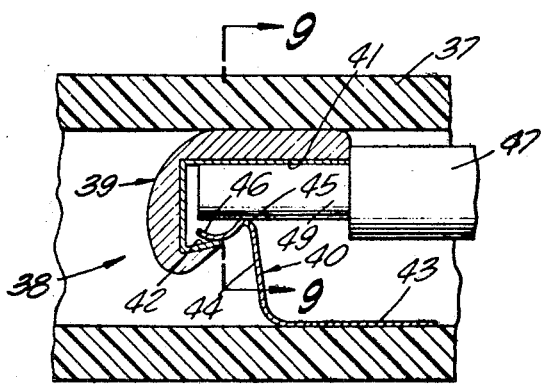
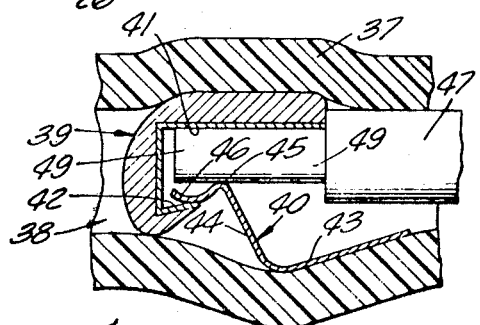
INVENTOR.
JUDSON DOUGLAS WETMORE
BY Lyon & Lyon
ATTORNEYS PATENTED NOV 23 1971 3,622,941
SHEET 2 OF 2
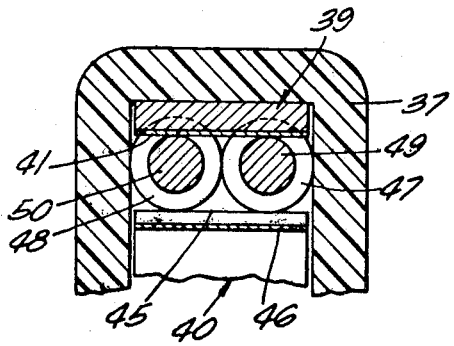
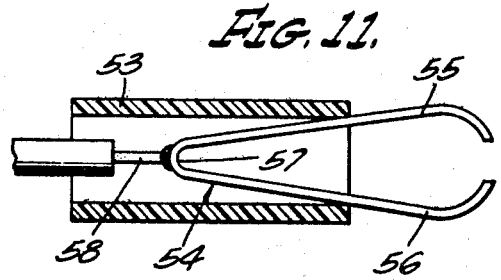
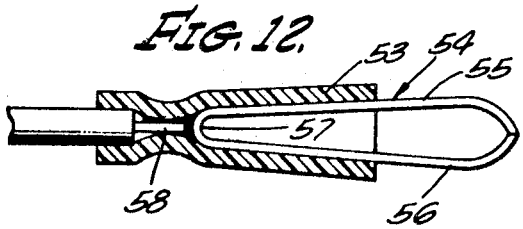
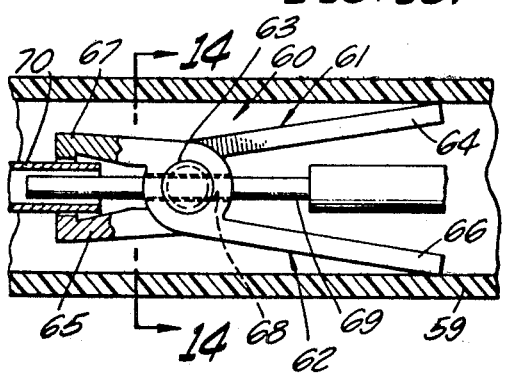
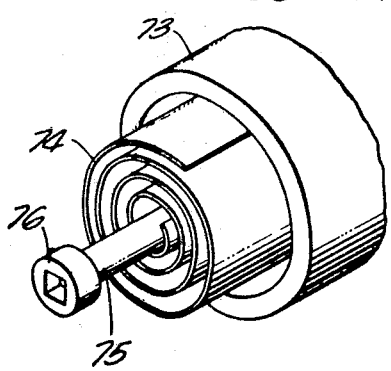
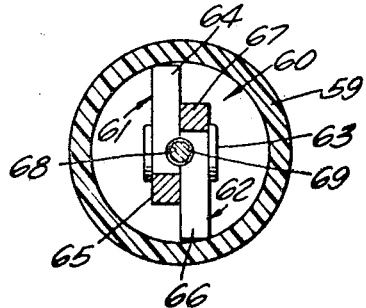
INVENTOR.
JUDSON DOUGLAS WETMORE
BY
Lyon Lyon
ATTORNEYS

HEAT RECOVERABLE ARTICLE WITH MECHANICAL INSERT

This application is a continuation-in-part of my copending application Ser. No. 591,914 Which was filed on Nov. 3, 1966 and entitled "Heat Recoverable Article With Mechanical Insert" now abandoned.

BACKGROUND OF THE INVENTION

This invention relates to heat recoverable articles and more particularly relates to such articles that are provided with mechanical inserts which provide a mechanical advantage.

In my patent, U.S. Pat. No. 3,243,211, several types of novel connectors for making, for example, soldered electrical connections, are disclosed. In the electrical connectors of that patent, the disclosure of which is incorporated by reference herein, a ring or ball-shaped solder insert is positioned within an independently dimensionally heat unstable member such as a sleeve. In a typical connector of this sort, both ends of the member or sleeve are open to receive the electrical conductors that are to be connected. The connector is then heated causing the member or sleeve to shrink and firmly grip the electrical conductors. The heat also causes the solder to flow and form a soldered connection between the two electrical conductors. The sleeve acts to contain the movement of the solder so that a good solder joint is assured.

In general, such members or sleeves are made of a material capable of having the property of plastic or elastic memory imparted thereto and are expanded under heat and pressure to a diameter greater than their normal diameter and cooled while under pressure. A sleeve treated in this manner will retain its expanded position until it is again heated to at least its heat recovery temperature at which time it will recover to its original shape. Examples of material useful in forming such dimensionally heat unstable recoverable members may be found in Currie U.S. Pat. No. 2,027,962 and Cook et al. U.S. Pat. No. 3,086,242, the disclosures of which are incorporated herein by reference. Polymeric materials which have been cross-linked by chemical means or by irradiation, for example, with high energy electrons or nuclear radiation, such as those disclosed in the Cook et al. patent are preferred for use in the present invention. Noncrystalline polymeric materials exhibiting the property of plastic or elastic memory, such as polyurethane, ionomers, etc., could also be used in practicing the present invention. Sleeves made from materials having either plastic or elastic memory are equally useful in the devices of the present invention; consequently, as used herein, the terms "elastic memory" and "plastic memory" are used interchangeably and are intended to be mutually inclusive.

Alternatively, metals having the property of heat recoverability may be used in place of or in combination with the foregoing heat recoverable organic materials. Suitable heat recoverable materials for use in this invention are described in Muldawer et al. U.S. Pat. No. 3,012,882 and Buehler et al. U. S. Pat. No. 3,174,851, and Buehler et al. "Martensitic Transformations in the TiNi Compound," a paper given at the Fifth International Symposium of the reactivity of solids, Munich, Germany, Aug. 5–8, 1964, reprinted in Reactivity of Solids, pp. 79–90 (Elsevier Publishing Company, Amsterdam, 1965), the disclosures of which are incorporated by reference herein.

It has been found that such independently dimensionally unstable sleeves or member are also useful in making mechanical connections, that is, connections which do not involve an intermediate bonding material such as solder. While the sleeve alone, when recovered over the objects to be connected, exerts a considerable force on the objects which restrains them from being separated, this force can be increased, and the connection consequently improved, by the provision of an insert in the sleeve which will transmit the shrinking or recovery forces of the sleeve to the object or objects and which has a mechanical advantage. The mechanical insert may be of the type utilizing the principle of a lever and may be designed so that the point where the force to be applied to the object or objects to be engaged or joined is between the fulcrum and the point where the recovery force is applied, on the opposite side of the fulcrum from the point where the recovery force is applied, or on the same side of, but more remote from, the fulcrum as the point where the recovery force is applied. Examples of each such type of device will be described although it should be understood that these examples are illustrative only and not restrictive.

Other mechanical inserts constructed in accordance with the principles of the present invention transmit the recovery forces of the sleeve to the object or objects to be operated on in such a manner that these transmitted forces are exerted in a direction other than the direction of movement of the sleeve as it recovers. Such forces, for example, can be exerted perpendicularly to the recovery forces or can be rotational in nature.

As used herein, the term "mechanical advantage" as applied to a mechanical insert according to the present invention is not meant to imply that the insert necessarily has a mechanical advantage greater than unity, that is, that the load force is greater than the applied force. Rather, this term is also meant to include those inserts in which the mechanical advantage is less than unity, that is, those in which the load force is less than the applied force but moves through a greater distance, and those inserts in which the resulting load movement is different either in direction or magnitude, from that of the applied movement.

It is therefore an object of the present invention to provide a recoverable article having a mechanical insert therein.

It is also an object of the present invention to provide such an article in which the mechanical insert has a mechanical advantage and is acted upon by the recovery force of a recoverable member.

It is another object of the present invention to provide an article including a recoverable member with a mechanical insert which multiplies the forces exerted by the recoverable member of the distance moved by the member upon the recovery thereof.

It is a further object of the present invention to provide such an article for making a strong mechanical connection to one or more objects.

It is yet another object of the present invention to provide an article including a recoverable member and a mechanical insert for exerting a force on an object in a direction other than the direction of the recovery forces of said member.

These and other objects and advantages of the present invention will become more apparent upon reference to the accompanying description and drawings in which:

BRIEF DESCRIPTION OF THE DRAWINGS

FIG. 1 is a cross-sectional view of a first article constructed in accordance with the present invention before recovery of the recoverable member;

FIG. 2 is a view taken along lines 2—2 of FIG. 1;

FIG. 3 is a cross-sectional view of the embodiment of FIG. 1 after recovery of the recoverable member;

FIG 4 is a cross-sectional view of a second article constructed in accordance with the present invention before recovery of the recoverable member;

FIG. 5 is a perspective view partially cut away, of the mechanical insert of FIG. 4;

FIG. 6 is a cross-sectional view of the embodiment of FIG. 4 after recovery of the recoverable member;

FIG. 7 is a view taken along lines 7—7 of FIG. 6;

FIG. 8 is a cross-sectional view of a third article constructed in accordance with the present invention before recovery of the recoverable member;

FIG. 9 is a view taken along lines 9—9 of FIG. 8;

FIG. 10 is a cross-sectional view of the embodiment of FIG. 8 after recovery of the recoverable article;

FIG. 11 is a cross-sectional view of a fourth article constructed in accordance with the present invention before recovery of the recoverable article;

FIG. 12 is a cross-sectional view of the embodiment of FIG. 11 after recovery of the recoverable member;

FIG. 13 is a cross-sectional view of a fifth article constructed in accordance with the present invention before recovery of the recoverable member;

FIG. 14 is a cross-sectional view taken along lines 14—14 of FIG. 13; and

FIG. 15 is a cross-sectional view of a sixth article constructed in accordance with the present invention before recovery of the recoverable member.

DESCRIPTION OF THE INVENTION

Turning now to the drawings, FIGS. 1 through 3 show a first article constructed in accordance with the present invention. An independently dimensionally heat unstable member or sleeve 10, constructed, for example, of one of the materials specified in the aforementioned Currie and Cook et al. patents, is provided with a mechanical insert indicated generally at 11. The insert 11 comprises a ring 12 on which is mounted a plurality of levers 13. Each of the levers 13 is provided with a loop 14 which passes around the ring 12, a short arm 15, an elbow 16, and a long arm 17 which terminates in a curved portion 18. Preferably, a pressure plate 19 is provided adjacent to each of the levers 13 to distribute the pressures exerted by the curved portion 18 and loop 14 of each of the levers 13 against the sleeve 10 so that they do not puncture the sleeve 10. As shown, to levers 13 are provided. However, as will be obvious, as many levers as are desired could be used. An object 20 is shown inserted in the insert and adjacent the elbows 16.

Figure 3 shows the position of the various elements after the sleeve 10 has been recovered. As can be seen, the recovery of the sleeve 10 has caused the elbows to engage the object 20, followed by the curved portions 18 of the levers 13 also engaging the object 20. Because the arm 17 is considerably longer than the arm 15, the force exerted by the recovery of the sleeve 10 is multiplied and applied to the object 20 by the elbow 16 causing the object 20 to be firmly held in place.

As shown in FIG. 3, the sleeve 10 is made sufficiently long so that it extends beyond the ends of the levers 13 and the pressure plates 19 so that it itself engages the object 20 upon recovery. This increases the forces holding the object in place. However, in some instances it may be desired to cause movement of the object 20 in response to a recovery of the sleeve 10 rather than a clamping of the object 20. For example, upon a rise in temperature, movement of the object 20 can be used to cause the opening or closing of an electrical switch. In such a case, the sleeve 10 would be somewhat shortened so that it would not exert any appreciable forces on the object 20 when it recovers, and the object 20 would be positioned relative to the levers 13 so that the inner end of the object 20 is to the right of the elbows 16. If desired, the end of the object 20 may be tapered. Then, when the sleeve 10 recovers because of a rise in the ambient temperature to a point equal to or above its recovery temperature, pivotal movement of the levers 13 around the ring 14 will cause the long arms 17 of the levers 13 to act as a camming surface for the object 20 causing it to move outwardly to the right. This movement in a direction perpendicular to the recovery forces, of course, can be used for any desired purpose.

Turning 4, 5, 6 to FIGS. 4, 5, 6 and 7, there is shown a second article constructed in accordance with the present invention. This article is somewhat similar to that shown in FIGS. 1 through 3 and is particularly useful for terminating two or more insulated electrical conductors and making an electrical connection between them. The details of the construction of this article are not a part of the present invention and were not invented by me. As shown, an independently dimensionally heat unstable sleeve or cap 22 constructed, for example, of one of the aforementioned materials, is provided with an open end 23 and a closed end 24. Although this is the desired configuration, it should be understood that both ends could be left open in the manner shown in FIG. 1. A conductive mechanical insert, generally indicated at 25, is positioned within the cap 22, the insert 25 being best illustrated in FIG. 5. The insert 25 is stamped or otherwise formed from a material such as copper and is provided with a lower channel 26 and an upper channel 27, the channels being integral with and hinged from an end plate 28. The lower channel 26 is provided with a plate 29 having an upstanding flange 30 which preferably has its upper edge formed as a knife edge. The upper channel 27 is provided with a similar plate 31 having a flange 32. If the insert 25 is not conductive, then the flanges 30 and 32 should be. The plates 29 and 31 can be attached to the channels 26 and 27 in any desired manner, for example, if the parts are metallic, by soldering. The fusing temperature of such solder should be higher than the recovery temperature of the sleeve. If desired, portions of the channels 26 and 27 could be punched out to form the flanges 30 and 32 instead of providing the separate plates 29 and 31.

When it is desired to terminate a pair of wires 33 and 34, they are inserted into the insert 25 in the cap 22 so that they extend beyond the flanges 32 and 30. The cap 22 is then heated to above its recovery temperature. As the cap 22 recovers, it exerts a force on the channels 26 and 27, particularly on their outer ends. This force is transmitted to the flanges 30 and 32 and is multiplied to the same manner as described in connection with Fig. 3. This force is also multiplied by the provision of the knife edges on the flanges 30 and 32 so that all of the forces are concentrated in a very small area. These forces cause the flanges 30 and 32 to pierce the insulation of the wires 33 and 34 and make good electrical contact with the conductors themselves as shown in FIG. 6.

Turning now to FIGS. 8, 9, and 10, there is shown a third article constructed in accordance with the present invention. In this article, a recoverable sleeve 37 of the type hereinbefore referred to has provided therein a mechanical insert 38 comprising a hook-shaped member 39 and a lever 40. The hook-shaped member 39 has a contact surface 41 and a lever engaging surface 42. The lever 40 comprises an actuating arm 43, a long arm 44, an elbow 45, and a short arm 46, the short arm 46 engaging the surface 42 of the member 39. One or more objects to be grasped or connected are inserted between the contact surface 41 of the member 39 and the elbow 45 of the lever 40. For example, as illustrated, a pair of insulated electrical conductors 47 and 48 having conductive portions 49 and 50 respectively are so inserted. As shown, the sleeve 37 is shown as rectangular in cross section; however, it should be understood that it could be cylindrical as shown in FIG. 2 or in the form of a cap as shown in FIG. 4.

When the sleeve 37 is heated to its recovery temperature, it begins to shrink inwardly causing the actuating arm 43 of the lever 40 to move toward the objects 47 and 48. This causes a corresponding movement of the long arm 44 which sees the elbow 45 as a fulcrum and causes the short arm 46 to move in a counterclockwise direction thereby exerting a force on the surface 42 of the member 39. This force is greater than the force originally exerted by the recovery of the sleeves because of the difference in the length of the arms 44 and 46. The exerting of the force on the surface 42 by the arm 46 causes the contact surface 41 to tightly engage the conductive portions 49 and 50 of the conductors 47 and 48 with the result that good mechanical and electrical contact is made. As can be seen, this embodiment employs the relationship load-fulcrum-force in contrast to the relationship of fulcrum-load-force employed in the first two articles described.

In FIGS. 11 and 12, there is shown a fourth article constructed in accordance with the present invention. The details of the construction of this article are not a part of the present invention and were not invented by me. They are the invention of William Rosse Heslop and are claimed in an application filed by him on the same day as the present application. In this article, a recoverable sleeve 53 has positioned therein a mechanical insert 54 in the form of a pair of griping arms 55 and 56 hinged at 57 to form what is essentially a pair of tongs. Any suitable support 58 can be used in connection with the tongs or the support can be deleted. When the sleeve 53 is recovered, as shown in FIG. 12, a force is exerted on the portions of the arms 55 and 56 nearest to the hinge 57 with the result that the outer ends of the arms 55 and 56 engage with each other or firmly grasp an object placed between them. By adjusting the position of the tongs relative to the sleeve a mechanical advantage can be obtained. This article would be useful, for example, for making an insert connection to a wire which is "lost" in a hole. As can be seen, this embodiment makes use of the relationship fulcrum-force-load and thus differs somewhat in this regard from the previous embodiments. Of course, the sleeve 53 could have either a cylindrical or rectangular cross section or could be replaced by a cap such as that shown in FIG. 4.

Turning now to FIGS. 13 and 14, a fifth article constructed in accordance with the present invention is illustrated. In this article, a recoverable sleeve 59 is provided with a mechanical insert 60 which in effect is similar to a pair of pliers. The insert 60 comprises first and second members 61 and 62 pivotally mounted on a pin 63. The member 61 has a leg portion 64 and an arm portion 65 while the member 62 has a similar leg portion 66 and an arm portion 67. If desired, the pin 63 and the members 61 and 62 can be provided with a bore 68 through which can be passed a suitable portion of one of the members to be connected. The arms 65 and 67 form jaws which engage either or both of the objects to be connected. When the sleeve 59 is heated to its recovery temperature, a force is exerted on the legs 64 and 66 of the members 61 and 62 causing them to more inwardly with the result that the jaws formed by the arms 65 and 67 exert a greater force on the object 70 and causing it, for example, to be crimped onto the object 69. Of course, if desired, only a single object may be clamped or a plurality of objects to be joined can be introduced through either end of the sleeve to extend between the jaws. This embodiment, like the embodiment of FIG. 8, utilizes the relationship load-fulcrum-force.

Turning now to FIG. 15, there is shown a sixth article constructed in accordance with the present invention. The details of the construction of this article are not part of the present invention and were not invented by me. They are the invention of William Rosse Heslop and are claimed in an application filed by him on the same day as the present application. In this article, a recoverable sleeve 73 is provided with a mechanical insert 74 in the form of a spiral spring. A rod 75 is fastened to the innermost leaf of the spring and the rod 75 is provided with an actuating means 76. When the sleeve 73 is caused to recover, the spring 74 is wound up with the result that the rod 75 and actuator 76 are caused to rotate, the movement of the rod being considerably greater than the movement of the outer leaves of the spring. This rotating motion could be used to actuate an alarm or could be used, for example, to screw on and insulate a cap at the same time. In the latter case the sleeve 73 would be made to extend over the object to be capped so that it would engage and insulate it upon recovery. If the shaft 75 was tapered, the recovery of the sleeve 73 and the winding up of the spring 74 would cause the shaft 75 to move outwardly up of the spring 74 would cause the shaft 75 to move outwardly much in the manner described in connection with the embodiment of FIG. 1. This outward movement could be used to close a switch or perform any other desired function.

From the foregoing description, it can be seen that apparatus has been provided for multiplying and/or converting the forces exerted by the recovery of a heat recoverable member into a greater force exerted by the recovery of a heat recoverable member or into a force exerted in directions other than the direction of recovery of the recoverable member. This is accomplished by the provision of simple mechanical inserts having a mechanical advantage within the recoverable member. The apparatus thus provided may be used to make simple and quick mechanical and/or electrical connections, operate switches and perform many other useful functions. Although various mechanical inserts are shown to illustrate the principals of the present invention, it should be understood that many others will be obvious to those skilled in the art and are contained within the scope of the present invention.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A recoverable article comprising a heat recoverable member and mechanical means having a mechanical advantage inserted therein.

2. The article of claim 1 wherein said recoverable member comprises a metal.

3. A recoverable article adapted to operate on an object, comprising a heat recoverable member and mechanical means having a mechanical advantage inserted therein and responsive to force exerted by heat recovery of said member to exert a different force on said object.

4. The article of claim 3 wherein said recoverable member comprises a metal.

5. A recoverable article comprising a heat recoverable member and mechanical means inserted therein for compounding the forces exerted by heat recovery of said member.

6. The article of claim 5 wherein said recoverable member comprises a metal.

7. A recoverable article adapted to operate on an object, comprising a recoverable member having the property of elastic memory and mechanical means having a mechanical advantage inserted therein, said means being engaged by said member upon heat recovery thereof and responsive to force exerted by said recovery to exert a force of different magnitude on said object.

8. The article of claim 7 wherein said recoverable member comprises a metal.

9. The article of claim 7 wherein said mechanical means comprises lever means and a fulcrum about which said lever means pivots said member upon recovery engaging a first portion of said lever means and a second portion of said lever means engaging said object.

10. The article of claim 9 wherein said first and second portions of said lever means are on the same side of said fulcrum.

11. The article of claim 9 wherein said first and second portions of said lever means are on opposite sides of said fulcrum.

12. The article of claim 7 wherein at least a portion of said force exerted on said object is in a direction different than the direction of said force exerted by recovery of said member.

13. The article of claim 7 wherein said force is substantially exerted on said object in the same direction as said said force exerted by recovery of said member.

14. The article of claim 12 wherein said portion of said force is exerted substantially perpendicular to said force exerted by recovery of said member.

15. A recoverable article adapted to operate on an object, comprising a sleeve of material which has been dimensionally changed from an original heat stable form to an independently dimensionally heat unstable material capable of moving in the direction of its original form upon the application of heat alone, and mechanical means having a mechanical advantage inserted in said sleeve, said means comprising ring means positioned in said sleeve and coaxial therewith and a plurality of lever means pivotally mounted on said ring means, each of said lever means comprising a short arm, a long arm and an elbow connecting said arms, said elbow being directly inwardly in said sleeve, the end portion of said long arm being acted on by said sleeve upon heat recovery thereof and another portion of said lever means engaging said object to transmit to said object the force exerted by heat recovery of said sleeve.

16. The article of claim 15 wherein said recoverable member comprises a metal.

17. The article of claim 15 wherein said portion of said lever means engaging said object comprises said elbow whereby the force exerted on said object is greater than the force exerted by heat recovery of said sleeve.

18. The article of claim 15 wherein said portion of said lever means engaging said object comprises a portion of said long arm whereby the force transmitted to said object upon recovery of said sleeve causes said object to move out of said sleeve.

19. The article of claim 15 wherein pressure plate means are positioned between each of said lever means and said sleeve.

20. A recoverable article adapted to operate on an object, comprising a sleeve of material which has been dimensionally changed from an original heat stable form to an independently dimensionally heat unstable material capable of moving in the direction of its original form upon the application of heat alone, and mechanical means having a mechanical advantage inserted in said sleeve, said means comprising hook-shaped means having a first surface for engaging said object and a second surface, and lever means having a short arm engaging said second surface, a long arm engageable by said sleeve upon heat recovery thereof, and an elbow joining said arms and engaging said object whereby the force exerted on said second surface is greater than the force exerted on said long arm by heat recovery of said sleeve.

21. The article of claim 20 wherein said recoverable member comprises a metal.

22. A recoverable article adapted to operate on an object, comprising a recoverable member having the property of elastic memory and mechanical means having a mechanical advantage inserted therein, said means being engaged by said member upon heat recovery thereof and responsive to movement of said member as a result of said recovery to cause movement of said object.

23. The article of claim 21 wherein said recoverable member comprises a metal.

24. In a connector for electrically and mechanically joining two or more wires, the combination of a sleeve of heat shrinkable plastic insulation; and a plurality of metallic clamp members disposed about the inner surface of said sleeve in spaced relation with each other for receiving at least two wires to be connected, so that application of heat produces shrinkage of said sleeve about the wires and clamp members compressing said clamp members against the wires.

25. In a connector for electrically and mechanically joining a pair of wires, the combination of a sleeve of heat shrinkable plastic insulation having two ends and open at least at one end; and a plurality of metallic clamp members disposed about the inner surface of said sleeve in spaced relation with each other and centrally located from said ends for receiving said wires inserted therein, so that application of heat produces shrinkage of said sleeve about the wires and clamp members compressing said clamp members against the wires.

26. In a connector for electrically and mechanically joining two or more wires, the combination of a sleeve of heat shrinkable plastic insulation having an open end and a closed end; and a plurality of metallic clamp members disposed about the inner surface of said sleeve in spaced relation with each other for receiving through said open end at least two wires to be connected, so that application of heat produces shrinkage of said sleeve about the wires and clamp members compressing said clamp members against the wires.

27. A recoverable article adapted to operate on an object, comprising a sleeve of material which has been dimensionally changed from an original heat stable form to an independently dimensionally unstable material capable of moving in the direction of its original form upon the application of heat alone, and mechanical means having a mechanical advantage inserted in said sleeve, said means comprising a first member having a leg portion and an arm portion, a second member having a leg portion and an arm portion, hinge means hingedly mounting said members together at a point intermediate the arm portions and leg portions thereof whereby movement of said leg portions toward one another causes said arm portions to move toward each other said sleeve engaging the ends of said leg portions remote from said hinge means and upon heat recovery acting on said leg portions to cause said arm portions to move toward each other to transmit to an object inserted therebetween the force exerted by heat recovery of said sleeve.

28. The article of claim 27 wherein said sleeve comprises a metal.

29. The article of claim 27 wherein said hinge means comprises a pin on which said members are rotatably mounted, said pin having an opening therethrough substantially coaxial with said sleeve whereby an object can be passed through said pin.

30. In a connector for joining a pair of elongated members, the combination of a sleeve of heat shrinkable material and a plurality of clamp members disposed about the inner surface of said sleeve for receiving said elongated members so that application of heat produces shrinkage of said sleeve about the elongated members and compresses said clamp members against said elongated members.

31. The connector of claim 30 wherein said sleeve and said clamp members comprise a metal.

32. A recoverable article adapted to operate on at least one object, comprising a heat recoverable member and mechanical means having a mechanical advantage therein, said mechanical means being responsive to force exerted by heat recovery of said member to exert a different force on said object.

33. The article of claim 32 wherein said recoverable member comprises a metal.

* * * * *